April 23, 1940.  P. DE MATTIA  2,197,968
APPARATUS FOR MOLDING SLIDE FASTENER TEETH
Filed March 24, 1938   2 Sheets-Sheet 1
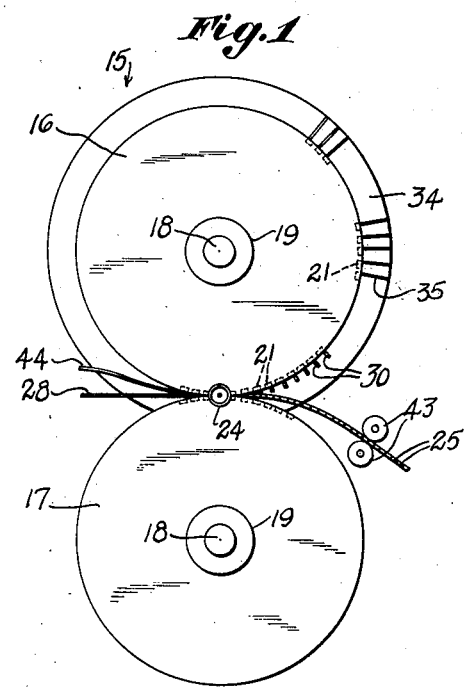
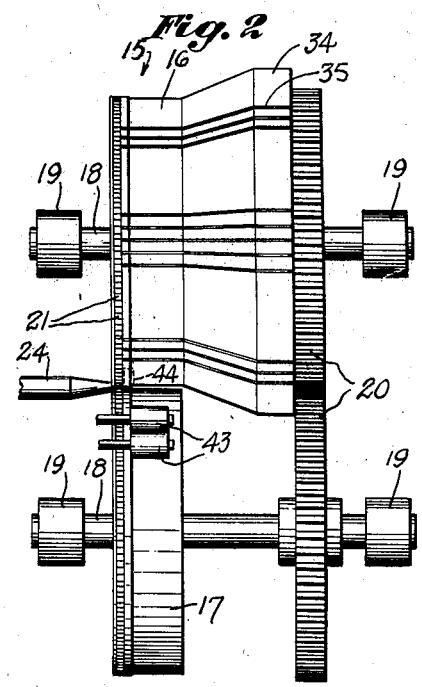
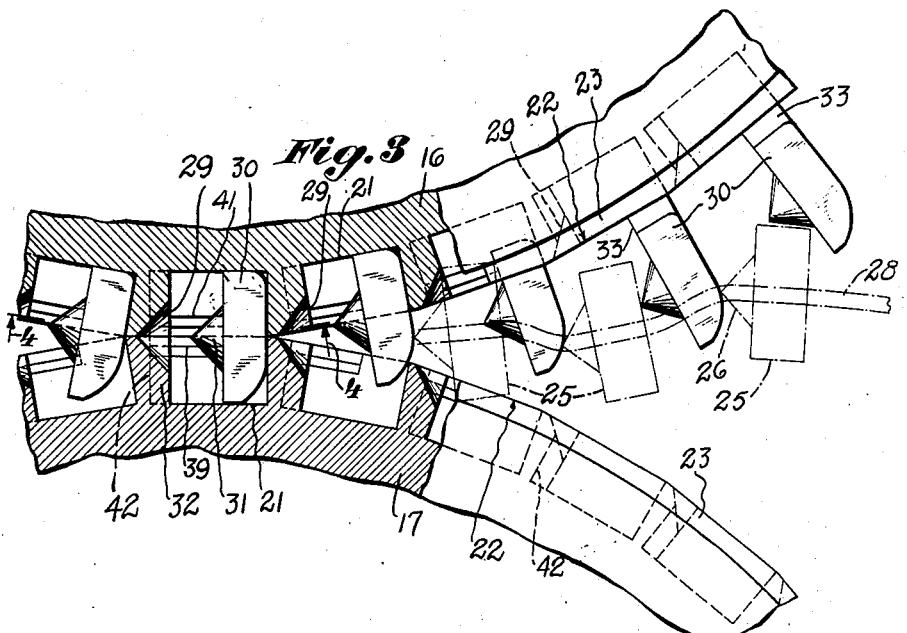
INVENTOR.
Peter De Mattia
BY Louis Schumacher
ATTORNEY.

April 23, 1940. P. DE MATTIA 2,197,968
APPARATUS FOR MOLDING SLIDE FASTENER TEETH
Filed March 24, 1938   2 Sheets-Sheet 2
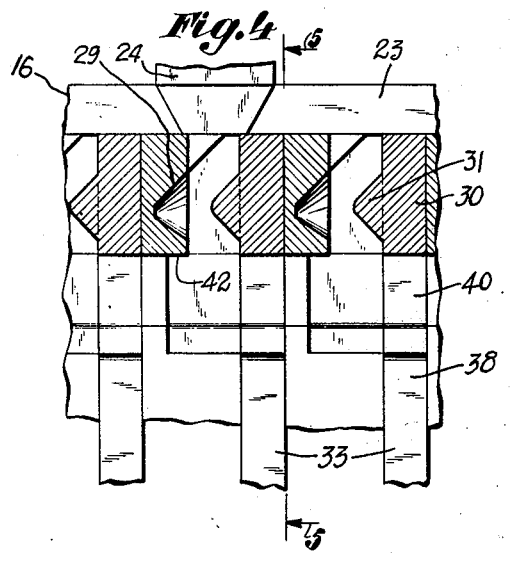
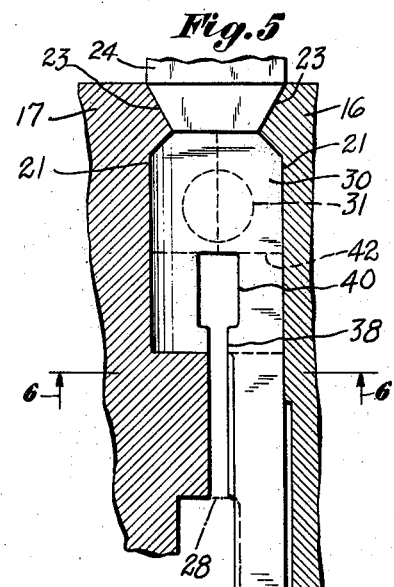
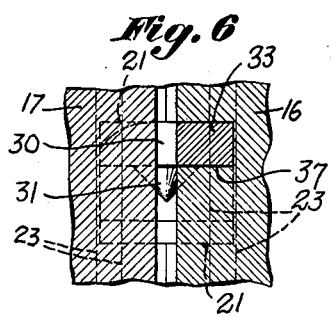
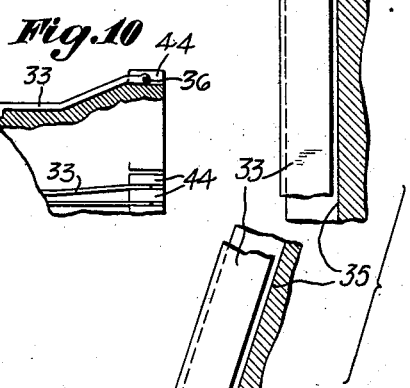
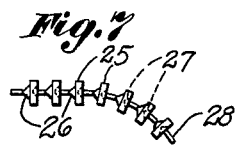
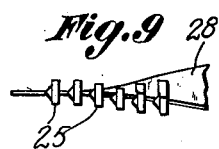

Patented Apr. 23, 1940

2,197,968

UNITED STATES PATENT OFFICE 2,197,968

APPARATUS FOR MOLDING SLIDE FASTENER TEETH

Peter De Mattia, Passaic, N. J.

Application March 24, 1938, Serial No. 197,799

11 Claims. (Cl. 18—21)

This invention relates particularly to apparatus and methods for the molding of teeth on a stringer to produce a slide fastener.

One object of the invention is to furnish an improved apparatus and method for the continuous molding of the teeth or coupling members of slide fasteners directly on the stringer thereof, and without breaking or marring the teeth on removal thereof from the molds or their associated parts.

Heretofore it has been proposed to mold the teeth or coupling members of slide fasteners on stringers by means of wheels having peripheral cavities which register to produce successive molds as the wheels rotate. This method and apparatus, while otherwise practical, has been unsuccessful because it has heretofore been impossible to strip from the molds the teeth interlocked therewith at the hooks and hook receiving recesses of the teeth. Nor was the art willing to accept a substitute whereby the teeth might be of special shape to facilitate removal from the mold, because such a construction involved a loss of efficiency in the slide fastener.

I have found that even if the use of removable cores were attempted, several problems presented themselves: first, the mounting of the cores for automatic movement into and out of their corresponding molds, and much more important and troublesome was the fact that the cores themselves were interlocked between the successive teeth, so that automatic disengagement of the same offered prior to the present invention an apparently insuperable difficulty. In other words, the teeth and the cores would strip out of the molds in interengaged relation at the hooks or recesses of the teeth, because the cores must substantially fill the spaces between the teeth, and while such interlocking was not as tight as in the mold itself, it was sufficiently snug to retard further progress of the art.

It is therefore an object of the invention to provide apparatus and method which shall overcome the difficulties hereinbefore mentioned and afford reliable and efficient ways and means for the making of slide fasteners having teeth molded on the stringers thereof.

An important object of the invention is to maintain the assembly relation of the cores and their molds, while automatically or otherwise manipulating the cores to separate the molded teeth therefrom.

While reference has been made to certain specific terms herein, it will be understood that the invention is applicable to the molding of similar structures on flexible members or stringers whether used for slide fasteners or not, and that a term such as wheel may include also a portion of a wheel, and in this connection it is desired to note that the invention is also applicable to plane members as well as to wheels having mold cavities. Although reference is made herein to molding, it will be understood that this term is applicable also to pressing, forming and even stamping operations, and among the materials that can be used may be included plastics comprising cellulose acetate or other material, resinous polymerized unsaturated organic compounds, phenolaldehyde resins, urea- or thiourealdehyde resins, polyhydric-alcohol-polybasic-acid resins, Celluloid containing substances impregnated with resins, rubber, and fibrous materials suitably impregnated, particularly where the materials can be injected into the mold cavities continuously or intermittently.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Figure 1 is a view in side elevation showing a device embodying the invention.

Fig. 2 is a view in end elevation thereof.

Fig. 3 is a fragmentary enlarged diagrammatic view of the invention, and showing in dot-dash lines the stringer and a tooth thereon in course of being detached from the cores.

Fig. 4 is a sectional view taken on the line 4—4 of Fig. 3.

Fig. 5 is a fragmentary sectional view taken on the line 5—5 of Fig. 4, and showing the stringer in dot-dash lines.

Fig. 6 is a sectional view taken on line 6—6 of Fig. 5.

Figs. 7, 8 and 9 are views of a stringer and its teeth as subjected to different deformations for removal from core elements according to my improved process.

Fig. 10 is a fragmentary view with parts in section showing a modified form of the invention.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Generally described, the invention provides a rotary wheel system of successive molds for continuously casting hooked teeth on stringers, wherein the core elements are removable with the teeth in interlocked engagement therewith and are movably or pivotally mounted for relative disaligning movement to separate the teeth from the core elements, while maintaining the latter in constant assembly relation with their respective mold cavities.

Referring in detail to the drawings, 15 denotes an apparatus embodying the invention and illustrative of the invention in the new method. The same may include a pair of members that may be plane or circular and have cavities adapted to register with each other to form a succession of molds for the slide fastener teeth. The invention is however best exemplified in a plurality of wheel members 16, 17 mounted on strong shafts 18 disposed in rigid bearings 19 and suitably intergeared at 20 for rotation at like speed. Said wheel members may be provided with peripherally disposed cavities 21 adapted to register with each other to form a succession of molds as the wheel members rotate. As shown in Fig. 3, said wheel members each have a succession of plane faces 22 at the cavities, so that the wheel members are actually polygonal in form, with the result that the cavities 21 register along planes to assure substantially liquid tight interengagement. The very minute yield required to permit rotation of the polygonal wheel members 16, 17 may be afforded by the usual degree of resilience obtainable in the shafts 18. At their front sides, the cavities 21 may have continuous annular bevels or openings 23 adapted to register with each other in the closed position of the molds to thus afford inlets therefor, registrable with the centrally disposed nozzle 24. These nozzles have accurate wiping contact with the adjacent mold faces to permit, for example, a molten plastic to be injected into the successive cooled molds under high pressure.

Disposed removably within the molds are core elements which cooperate with the mold cavities 21 to form teeth or coupling elements such as 25 of a required conformation. Desirably these teeth have hook portions such as 26 and recesses such as 27, and are molded directly on a flexible carrier member such as a stringer or tape 28. Illustratively, the molds provide recesses 29 for forming the hook portions 26, and the core elements 30 provide point portions 31 for forming the tooth recesses 27. The walls 32 that separate the mold cavities from each other are as thin as possible at the apices of the mold recesses 29, consistent with the strength of the powerful metal of which the molds are made. This is desirable in order that the teeth 25 shall be molded of approximately full thickness for reliable slide fastener interlocking action, with the core elements 30 serving as a spacing as well as a core means for the teeth 25. In fact, the wall 32 at the apex of the recess 29 may be considered as allowing for a clearance that may be desirable in the slide fastener action. Obviously then, the relationship of the parts is such that when the teeth 25 are stripped from the molds with their cores 30, the latter are interlocked between the successive teeth in the same manner as the different teeth of a slide fastener interlock when the latter is closed. This presents the principal problem of my invention.

I overcome this problem by subjecting the tooth bearing stringer to a bending or curving action, transversely as shown in Fig. 7, or along the plane thereof as shown in Fig. 8, or to a combination of these actions as shown in Fig. 9. Further, I accomplish this automatically and without destroying the assembly relation of the core elements and their respective molds. Preferably I mount the core elements 30 on the individual pivotal arms 33 or other movable means which are arranged to rotate with one of the wheel members 16, at the speed thereof. Desirably the wheel member 16 may have a portion 34 of enlarged diameter which may be formed with guide slots 35 that lie in radial planes, and in which the arms 33 may be pivotally mounted as at 36 so that the arms move partially into and out of the slots while moving the core elements 30 into and out of the cavities 21 of the wheel member 16. In course of such movement, the arms 33 are accommodated in the openings 37 of the mold cavities of the wheel member 16, see Fig. 6, while the stringer enters the slots 38 of the core elements and is compressed between an arm 33 and the adjacent wheel member 17. It may be noted at this point that the closed mold affords an opening as at 39, see Fig. 3, at the parting line thereof to snugly receive the stringer 28. The slot opening 39 is arranged to continuously receive the stringer and may conform to the polygonal shape of the wheel members. If the stringer should have an enlarged marginal bead portion, the slots 38, 39 may be correspondingly formed as at 40, 41, respectively, to fit such bead portion, the flexibility of a stringer of textile fabric permitting easy insertion and removal thereof relative to the slot openings 38, 40 of the core element 30. If the base portions of the teeth 25, at which they are secured to the stringer be enlarged, the molds may have undercut portions as at 42. In any event, it is easy to strip from the molds the molded teeth engaged with the core elements, without limiting the structure to any specific shape of tooth.

By the provision of the pivoted arms 33 which lie in planes passing through the diameter of the wheel member 16, the separation of the arms and hence of their end core elements 30 naturally increases or tends to increase as the arms move outward of the axis of the wheel member and remove the core elements as shown in Fig. 3. If now an outward pull is exerted on the stringer, manually or by means of a pair of rollers 43, adjacent core elements 30 tend to move out of alinement with each other. These two actions cooperate to permit easy disengagement of the teeth 25 as shown in Fig. 3. Actually, what occurs is similar to the performance of a slider in opening a slide fastener, and in which the two series of teeth are caused to diverge. So in the present invention the removed coupling elements lie along an upward curving arc while the slide fastener teeth lie along a downward curving arc.

By pivotally mounting the arms 33 along a circle of suitably larger diameter than the wheel member 16, the core elements can readily clear their relatively snugly fitting mold cavities on the wheel member 16.

After leaving the molds, the core elements 30 may remain outside of their molds until returned thereto as by a stationary guide or deflector 44 which may enter almost between the meeting edges of the wheel members.

If desired, the arms 33 may be resilient, and may act elastically to further facilitate separation of the teeth and core elements. In that case the structure may be as in Fig. 10, with the slots 44 terminating remotely from the core elements to permit a slight torsion or bending of the arms, when the core elements are free of their molds. Thus the arms may be bent by pulls on the stringer in various directions or by forces directly applied to said arms to obtain the actions of Figs. 8 and 9, as well as that of Fig. 7 which is particularly contemplated herein. Consequently, the cores may be used with mold cavities disposed along planes. In that case, when the mold cavities are separated, an angular pull on one end of the stringer causes a successive lateral deflection of the successive resilient arms by the teeth and consequent disengagement.

It is desirable that the injection pressure of the plastic into the dies shall be constant, because the molding speed is rather high. In other words, the die faces that contact the injector nozzle act as a cut off between the molds. To maintain such constant pressure various types of pumps may be used, such as rotary or reciprocatory pumps. If the latter, a series of these pumps, with suitable check valves, as is well known in the art, or even a large pressure storage reservoir. My preferred method is to rely on the crystalline or packing quality of a plastic in its solid condition, and to powerfully compress and hence pack such plastic in a passage that is sufficiently small in diameter to permit such packing to be maintained even on retraction of the piston, the packing passage leading to a heated plastifying chamber and hence to the injection nozzle. If desired, the packing passage may diverge toward the plastifying chamber so as to permit easier forward movement and in effect provide a tapered closure plug of the solid plastic preventing return movement thereof while the piston is being retracted. This method can be used with one or more intermittently operating pistons.

Accordingly the material which is constantly under injection pressure in the nozzle 24 is cut off and the nozzle closed while a mold is moving into engagement with the nozzle. When the nozzle registers with a mold it forms a closure wall therefor, whereby gates and resultant trimming are avoided.

I claim:

1. A device for molding slide fastener teeth on stringers including a plurality of members having die cavities adapted to register with each other to provide successive molds, each tooth having opposite releasable locking portions, removable cores for the molds, each core molding at least one of said locking portions, means external of the molds for movably mounting the cores, said means being expandible to increase the spaces between the cores in course of stripping the slide fastener from the cores, said cores being substantially equal in thickness to the spacing between the teeth and coacting with the molds to determine said spacing.

2. A device for molding slide fastener teeth on stringers including a plurality of members having die cavities adapted to register with each other to provide successive molds, each tooth having opposite releasable locking portions, removable cores for the molds, each core molding at least one of said locking portions, means external of the molds for movably mounting the cores, said means being expandible to increase the spaces between the cores in course of stripping the slide fastener from the cores, and other means mounting the first mentioned means so that the latter follows a generally arcuate path in its expanded position to facilitate disengagement of the cores from the locking portions of the teeth.

3. A device for molding slide fastener teeth on stringers, including a plurality of members each having a succession of cavities, with the cavities of the different members adapted to separably register to provide a succession of molds, the members having walls between the cavities, each wall having a recess, the recesses in the different cavities registering to form the hooks on the teeth when the molds are closed, and removable cores in the molds, each core having a core wall and a projection extending toward and generally alined with the adjacent mold recess to form the recess in the tooth, each core wall resting against an adjacent one of said mold walls remotely from the mold recess, the thickness of said core wall and of said adjacent mold wall at the apex of said mold recess controlling the spacing between the successive teeth molded on the stringer, said members having a continuous groove along the parting line of said molds, said groove having its inner face in coincidence with adjacent inner faces of the molds, an injection nozzle having its orifice slidingly seated in said groove and adapted to successively register with the molds, and the inner face of the groove forming a closure for the orifice between the molds, whereby the teeth can be molded without forming gates.

4. A device for molding slide fastener teeth on the stringers thereof, including a plurality of wheel members having peripheral spaced cavities adapted to register with each other to form molds on rotation of the wheel members, the latter having annular recesses coacting to provide a groove continuously intersecting the molds at the parting line thereof at the point of tangent contact of the wheel members, and an injection nozzle having its orifice portion seated in said groove for successively communicating with the molds, and the latter having wall portions intermediate of the molds for closing said orifice portion, whereby the teeth can be molded without forming gates.

5. A device for molding slide fastener teeth including a plurality of wheel members having spaced peripheral cavities adapted to register with each other to provide successive molds on rotation of the wheel members, removable cores in said molds, means removably mounting said cores on one side of the wheel members, at least one of the wheel members having at on opposite side a seating face intersecting the mold cavities, and a stationary injection nozzle having an orifice portion slidingly seated on said face for successive communication with the mold cavities, the molds having walls therebetween for closing the orific portion along said seat, whereby the teeth can be molded without forming gates.

6. A device for molding slide fastener teeth on the stringers thereof including wheel members, parallel shafts having fixed bearings for mounting the same, said wheel members having peripheral cavities adapted to register with each other to provide successive molds on rotation of the wheel members, the latter being polygonal and having plane surfaces at the parting line of each mold for accurate closing of the molds, and said shafts being resilient to permit the polygonal wheel members to move toward and away from each other on rotation thereof, with the shafts serving to powerfully press the wheel members toward each other at the registering plane surfaces thereof.

7. A device for molding slide fastener teeth on the stringer thereof, including a plurality of wheel members having peripheral spaced cavities adapted to register with each other to form successive molds on rotation of the wheel members, cores in said molds, and elements for individually mounting said cores for removal from the molds, all of said elements being individually pivotally mounted on one of the wheel members, the pivotal axes of the elements being remote from the cores and lying along a circle coaxial with said wheel member, and said cores being radially removable from said molds with said elements movable radially outward to maintain certain of the removed cores along an arc with the spacing of the cores increased due to the increased distance of the cores from the axis of the wheel member.

8. A device for molding the teeth of slide fasteners on the stringers thereof, including a plurality of wheels having peripheral spaced cavities adapted to register with each other to provide successive molds on rotation of the wheels, removable cores for the molds, and individual arms, individually pivotally mounted on one of the wheels for generally radial outward movement, said cores being mounted on the different arms.

9. A device for molding teeth on a stringer including a pluraliay of wheels having peripheral spaced mold cavities adapted to successively register with each other on rotation of the wheels to form successive molds, each wheel having walls between the cavities thereof, each wall having a recess on one side thereof, the recesses on the different wheels mating with each other to mold the hook of a slide fastener tooth, each mold having a removable core, each core being slidably disposed against certain of said walls at an opposite face thereof and having a projection facing the opposed recess of the mold to form the recess of the slide fastener tooth, individual arms for mounting the cores, said arms being individually pivotally mounted on one of said wheels so that the arms are movable radially outward upon radial removal of the cores from the molds, with the spacing between the cores increasing due to such movement, whereby the slide fastener teeth can be readily stripped from the projections on the cores.

10. A device for molding teeth on a stringer including a plurality of wheels having peripheral spaced mold cavities adapted to successively register with each other on rotation of the wheels to form successive molds, each wheel having walls between the cavities thereof, each wall having a recess on one side thereof, the recesses on the different wheels mating with each other to mold the hook of a slide fastener tooth, each mold having a removable core, each core being slidably disposed against certain of said walls at an opposite face thereof and having a projection facing the opposed recess of the mold to form the recess of the slide fastener tooth, individual arms for mounting the cores, said arms being individually pivotally mounted on one of said wheels so that the arms are movable radially outward upon radial removal of the cores from the molds, with the spacing between the cores increasing due to such movement, whereby the slide fastener teeth can be readily stripped from the projections on the cores, said molds having openings at one side on the parting line of the molds to embrace said arms, said wheels being undercut at said side of the molds to receive the stringer, said molds being open and said walls cut away on their parting lines at an opposite side of the molds, and an injecting nozzle for plastic having its end having sliding contact with said walls to directly communicate with said molds and to cause the slide fastener teeth to be molded without producing gates.

11. A device for molding slide fastener teeth on the stringers thereof, including a plurality of wheel members having peripheral cavities adapted to register with each other to form successive molds on rotation of the wheel members, and means coaxial with one of the wheel members and mounted thereon for radial outward movement at successive points along said means, and cores for said cavities, said cores being engaged with said means and being movable radially outward of said wheel member for removability from their molds.

PETER DE MATTIA.